US010612401B2

(12) United States Patent
Fulayter et al.

(10) Patent No.: US 10,612,401 B2
(45) Date of Patent: Apr. 7, 2020

(54) PIEZOELECTRIC DAMPING RINGS

(71) Applicant: Rolls-Royce Corporation, Indianapois, IN (US)

(72) Inventors: Roy D. Fulayter, Avon, IN (US); Daniel Hoyniak, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 544 days.

(21) Appl. No.: 15/410,129

(22) Filed: Jan. 19, 2017

(65) Prior Publication Data

US 2017/0306772 A1    Oct. 26, 2017

Related U.S. Application Data

(63) Continuation-in-part of application No. 14/845,478, filed on Sep. 4, 2015.

(60) Provisional application No. 62/048,071, filed on Sep. 9, 2014.

(51) Int. Cl.
| | |
|---|---|
| *F01D 5/34* | (2006.01) |
| *F01D 25/04* | (2006.01) |
| *F04D 29/66* | (2006.01) |
| *F01D 5/10* | (2006.01) |
| *F01D 5/12* | (2006.01) |
| *F04D 29/32* | (2006.01) |

(52) U.S. Cl.
CPC .............. *F01D 5/34* (2013.01); *F01D 5/10* (2013.01); *F01D 5/12* (2013.01); *F01D 25/04* (2013.01); *F04D 29/321* (2013.01); *F04D 29/324* (2013.01); *F04D 29/668* (2013.01); *F05D 2220/32* (2013.01); *F05D 2260/407* (2013.01); *F05D 2260/96* (2013.01); *Y02T 50/672* (2013.01)

(58) Field of Classification Search
CPC ..... F01D 5/10; F01D 5/16; F01D 5/26; F01D 25/04; F01D 25/06
See application file for complete search history.

(56) References Cited

U.S. PATENT DOCUMENTS

| | | | |
|---|---|---|---|
| 6,375,428 B1 * | 4/2002 | Stangeland | ............... F01D 5/10 416/190 |
| 6,514,046 B1 | 2/2003 | Morrison et al. | |
| 6,808,363 B2 | 10/2004 | Darkins, Jr. et al. | |
| 7,090,459 B2 | 8/2006 | Bhate et al. | |

(Continued)

*Primary Examiner* — Justin D Seabe
*Assistant Examiner* — Cameron A Corday
(74) *Attorney, Agent, or Firm* — Barnes & Thornburg LLP

(57) ABSTRACT

A blisk assembly for vibration dampening includes a disk portion extending circumferentially about a central axis of the blisk, a plurality of blades integrally coupled to the disk, and a piezoelectric damping ring that includes a damping ring and a plurality of piezoelectric elements coupled to the damping ring. The disk portion includes a groove configured to receive the piezoelectric damping ring. As a result of centrifugal forces applied to the piezoelectric damping ring during rotation of the blisk assembly, mechanical energy may be generated at one or more of the plurality of piezoelectric elements, which is converted to electrical energy and transmitted to another one or more of the plurality of piezoelectric elements. Accordingly, the one or more of the piezoelectric elements having received the electricity can convert the electricity to mechanical energy to provide vibration damping.

14 Claims, 7 Drawing Sheets

(56) References Cited

U.S. PATENT DOCUMENTS

| | | |
|---|---|---|
| 7,258,942 B2 | 8/2007 | Chou et al. |
| 7,497,443 B1 | 3/2009 | Steinetz et al. |
| 8,132,442 B2 | 3/2012 | Merrill et al. |
| 8,206,098 B2 | 6/2012 | Prill et al. |
| 2007/0018539 A1* | 1/2007 | Nagashima .......... H03H 9/059 310/348 |
| 2014/0250893 A1 | 9/2014 | Chan et al. |
| 2015/0104295 A1* | 4/2015 | Viguie ................ F16F 15/005 415/119 |

\* cited by examiner

PIEZOELECTRIC DAMPING RINGS

CROSS-REFERENCE TO RELATED U.S. APPLICATION

This application is a continuation-in-part of U.S. patent application Ser. No. 14/845,478 filed 4 Sep. 2015, which claims priority to and the benefit of U.S. Provisional Patent Application 62/048,071, filed 9 Sep. 2014, the original disclosures of both cross-referenced applications are now expressly incorporated herein by reference.

FIELD OF THE DISCLOSURE

The present disclosure relates generally to turbofan engines, including but not limited to those used in propulsion drive systems, such as aircrafts. More specifically, the present disclosure relates to using piezoelectric damping rings for use in turbomachinery blisks (i.e., bladed disks) for dampening vibrations.

BACKGROUND

Gas turbine engines can be used as a primary power source to power aircraft, watercraft, and other types of vehicles, as well as power generators and the like. For example, aerospace applications of gas turbine engines include turboshaft, turboprop, and turbofan engines. Gas turbine engines typically include one or more compressors, a combustor, and one or more turbines. In typical aerospace applications, a fan or propeller is used to provide the majority of the engine thrust and is located in front of the core engine. The compressor, in which inlet air is compressed, includes alternating stages of rotating blades and static vanes, which increase the pressure of the air as it travels through the gas turbine core.

The compressor outputs higher-pressure air, which it delivers to the combustor, wherein fuel is combusted with the compressed air. As a result, exhaust gas is generated and directed to the one or more turbines, wherein the exhaust gas can be used to rotate one or more rotating disks with blades integrally attached. In typical aerospace applications, the gas turbine engine provides thrust to propel the aircraft, and also supplies power for accessories of the engine and/or the aircraft. Accordingly, such integrally bladed rotors, or blisks (i.e., bladed disks), can additionally and/or alternatively be used for other components of the gas turbine engines, such as compressors, fan blade rotors, etc.

Each blisk consists of a single element combining both a rotor disk and blades, as opposed to a disk and a plurality of individual, removable blades. Typically, during operation of turbofan engines, vibration, such as harmonic vibration from the blades of the blisk, is introduced. Such vibration may introduce engine wear, thereby reducing engine life. Accordingly, such blisks are generally required to undergo harmonic vibration testing. Conventional technologies to mitigate the vibrations include damping rings, which may be used on blisks of turbofan engines, to reduce or otherwise dampen such vibration when relative motion exists on the disk rim and the damping ring, for example.

SUMMARY

The present disclosure may comprise one or more of the following features and combinations thereof.

According to one aspect of the present disclosure, a blisk assembly adapted for use in a gas turbine engine includes a disk extending circumferentially about a central axis of the blisk assembly, wherein the disk includes a groove that extends circumferentially about a portion of the disk axisymmetric about the central axis, and wherein the groove is substantially concave in shape. The blisk assembly additionally includes a plurality of blades integrally coupled to the disk that extend outwardly from the disk in a radial direction away from the central axis. The blisk assembly further includes a piezoelectric damping ring that includes a damping ring and a plurality of piezoelectric elements coupled to the damping ring. The piezoelectric damping ring extends substantially around the central axis within the groove and each of the piezoelectric elements is configured to convert electrical energy in response to generation of mechanical energy and to convert received electrical energy to mechanical energy in response to receipt of electrical energy from another of the piezoelectric elements so that vibrations of the blisk assembly are dampened by distribution of energy across one or more of the piezoelectric elements.

In some embodiments, the blisk assembly may further include a plurality of wires, wherein each wire connects at least two of the plurality of piezoelectric elements to each other to transmit the electricity therebetween.

In some embodiments, the blisk assembly may further include another piezoelectric damping ring that is located in another groove that extends circumferentially about another portion of the disk axisymmetric around the central axis.

In some embodiments, each of the piezoelectric elements are coupled to the damping ring using discrete bonding.

In some embodiments, each of the piezoelectric elements includes a metal spray coating to provide an electrically conductive means to send and receive power.

In some embodiments, each of the piezoelectric elements are comprised of ceramic composite material.

In some embodiments, the plurality of piezoelectric elements comprises a first and second piezoelectric element, wherein each of the first and second piezoelectric elements are connected via a wire, wherein the first piezoelectric element is configured to transmit electricity converted from mechanical energy received at the first piezoelectric element to the second piezoelectric element.

In some embodiments, the first and second piezoelectric elements are coupled to the damping ring in different locations along the damping ring to send and received vibration from different nodal diameter patterns.

In some embodiments, each of the piezoelectric elements are circumferentially spaced an equidistant amount from neighboring piezoelectric elements.

In some embodiments, each of the piezoelectric elements is connected to another of the piezoelectric elements via a wire.

In some embodiments, every other of the piezoelectric elements is connected to another of the piezoelectric elements via a wire.

In some embodiments, the groove defines a radially inwardly opening channel.

According to yet another aspect of the present disclosure, a piezoelectric damping ring assembly adapted for use in a blisk of a gas turbine engine, the piezoelectric damping ring includes a damping ring that extends circumferentially about a central axis and a plurality of piezoelectric elements coupled to a surface of the damping ring that faces the central axis, wherein each of the piezoelectric elements are equally spaced about the damping ring, and wherein each of the piezoelectric elements are configured to (i) receive mechanical energy, (ii) convert the stored mechanical energy to electricity, (iii) transmit the electricity to another of the piezoelectric elements, (iv) receive converted electricity from another of the piezoelectric elements, and (v) convert the received converted electricity to mechanical energy to dampen vibrations of the blisk.

In some embodiments, the piezoelectric damping ring assembly includes a plurality of wires, wherein each wire connects at least two of the plurality of piezoelectric elements to each other to transmit electricity therebetween.

In some embodiments, each of the piezoelectric elements are coupled to the damping ring using discrete bonding.

In some embodiments, each of the piezoelectric elements are comprised of ceramic composite material and wherein each of the piezoelectric elements includes a metal spray coating to provide an electrically conductive means to send and receive power.

According to still another aspect of the present disclosure, a method of vibration damping of a blisk adapted for use in a gas turbine engine includes providing a piezoelectric damping ring in a groove extending outward in a radial direction from a radially inward facing surface of a disk portion of the blisk, wherein the groove extends circumferentially about a portion of the disk axisymmetric around a central axis of the blisk, and wherein the piezoelectric damping ring comprises a damping ring and a plurality of piezoelectric elements coupled to the damping ring, rotating the blisk to generate centrifugal force on the piezoelectric damping ring to generate micro-sleep between the piezoelectric damping ring and the disk, transferring electricity from a first piezoelectric element of the plurality of piezoelectric elements to a second piezoelectric element of the plurality of piezoelectric elements, and dampening vibrations of the blisk as a function of the electricity received at the second piezoelectric element.

In some embodiments, transferring the electricity from the first piezoelectric element to the second piezoelectric element includes capturing mechanical energy at the first piezoelectric element as a product of the micro-slip between the piezoelectric damping ring and the disk, converting the mechanical energy to electricity at the first piezoelectric element, transmitting, via a wire coupling the first piezoelectric element to the second piezoelectric element, the electricity from the first piezoelectric element to the second piezoelectric element, and converting the electricity to mechanical energy at the second piezoelectric element.

In some embodiments, dissipating the mechanical energy at the second piezoelectric element comprises dissipating the mechanical energy as a product of mechanical friction between the piezoelectric damping ring and the disk.

In some embodiments, the method further includes dissipating the mechanical energy through heat due to mechanical friction at the second piezoelectric element.

According to another aspect of the present disclosure, further blisk assemblies adapted for use in gas turbine engine are described. Blisk assemblies in accordance with these embodiments may include a disk extending circumferentially about a central axis of the blisk assembly, a plurality of blades integrally coupled to the disk that extend outwardly from the disk in a radial direction away from the central axis, and a piezoelectric damping ring that includes a damping ring and a plurality of piezoelectric elements coupled to the damping ring.

In illustrative embodiments, the piezoelectric damping ring may form a full hoop around the central axis. Each of the piezoelectric elements included in the piezoelectric damping ring may be configured to convert electrical energy in response to generation of mechanical energy. Each of the piezoelectric elements included in the piezoelectric damping ring may also be configured to convert received electrical energy to mechanical energy in response to receipt of the electrical energy from another of the piezoelectric elements. Accordingly vibrations of the blisk assembly may be dampened by distribution of energy across one or more of the piezoelectric elements.

These and other features of the present disclosure will become more apparent from the following description of the illustrative embodiments.

DETAILED DESCRIPTION OF THE DRAWINGS

Figure 1:
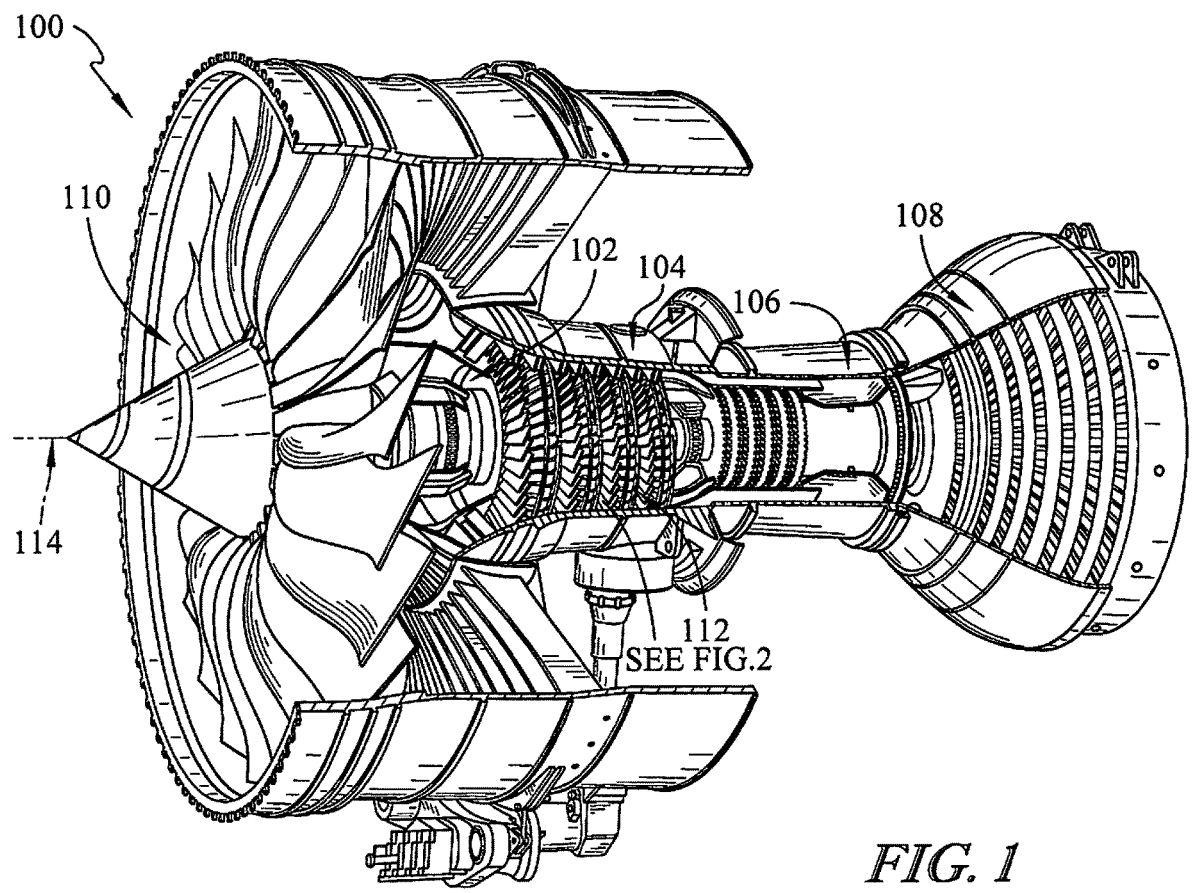
FIG. 1 is a cutaway view of a gas turbine engine including a compressor upstream of a combustor for providing compressed air to the combustor and showing that the compressor includes one or more blisks arranged therein.

For the purposes of promoting an understanding of the principles of the disclosure, reference will now be made to a number of illustrative embodiments illustrated in the drawings and specific language will be used to describe the same.

An illustrative gas turbine engine 100 for use in aircraft includes an air intake 102, a compressor 104, a combustor 106, and a turbine 108. The compressor 104 may be used to compress air drawn into the air intake 102 of the gas turbine engine 100 by a fan 110, which delivers at least a portion of intake air into the compressor 104. The compressor 104 may be comprised of one or more compressors configured to provide the compressed air (i.e., high pressure air) to the combustor 106. The illustrative compressor includes an intermediate pressure compressor 116 and a high pressure compressor 118.

In the combustor 106, fuel is mixed with the high pressure air and is ignited, the products (e.g., exhaust gases) of which are directed into the turbine 108 where energy is extracted to drive the compressor 104 and, typically, one or more shafts of the turbine 108 (e.g., for powering the fan 110). In some embodiments, the turbine 108 may include a low power turbine, an intermediate power turbine, and/or a high power turbine, each of which may be single or multi-stage turbines. In other embodiments, such as in steam turbine applications, for example, the turbine 108 may additionally or alternatively include a low pressure turbine, an intermediate pressure turbine, and/or a high pressure turbine, each of which may be single or multi-stage turbines.

In the illustrative gas turbine engine 100, one or more blisks 112, or bladed disks, also commonly referred to as integrally bladed rotors (IBRs), are illustratively shown in the compressor 104 of the gas turbine engine 100 extending around a central axis 114 of the gas turbine engine 100. It should be appreciated that, in some embodiments, the blisks 112 may be located in additional and/or alternative locations, such as the fan 110, the turbine 108, or any other rotating component of the gas turbine engine 100.

Figure 2:
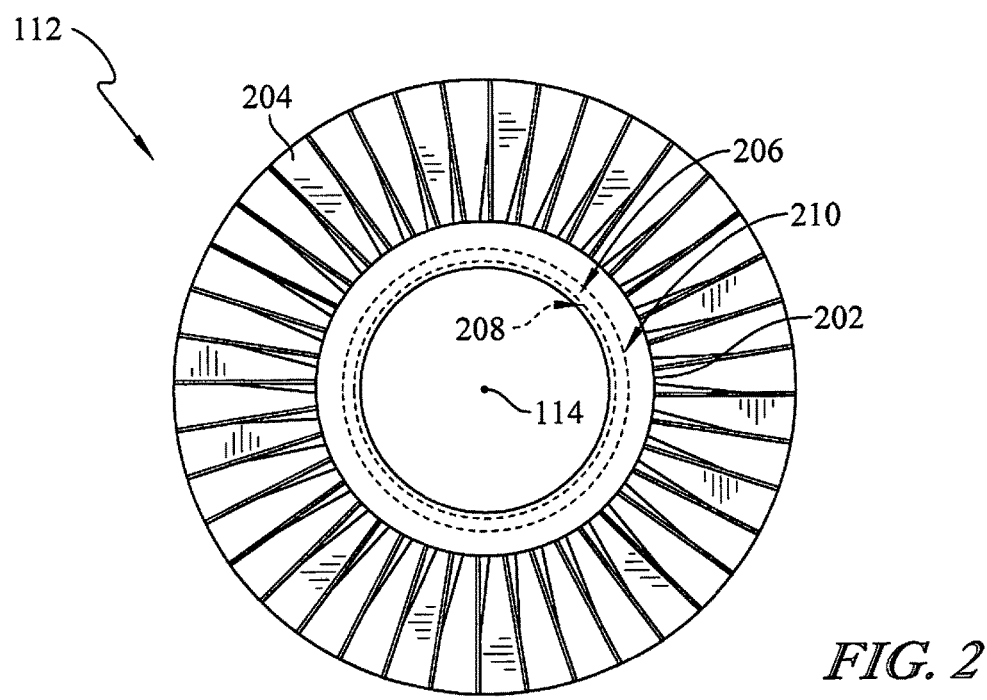
FIG. 2 is a perspective view of one blisk included in the compressor of FIG. 1 showing a single element assembly comprising a disk and a plurality of blades integrally oriented about outer portion of the disk and a groove extending circumferentially about the underside of the disk.

As shown in FIG. 2, the illustrative blisk 112 includes a plurality of blades 204 integrally coupled circumferentially about an outer side of a rotor disk 202 that is capable of being coupled to a shaft of a rotor assembly of a rotary mechanical device (e.g., a power turbine shaft (not shown) of the gas turbine engine 100). The blisk may be comprised of a single, solid piece of material that includes a disk portion and a plurality of blades extending therefrom, thereby eliminating the use of screws, bolts, or other coupling materials typically used to attach blades to a disk. Accordingly, various manufacturing processes may be used to manufacture the blisk 112; however, such processes are beyond the scope of the present application. For example, in some embodiments, one or more of the blades may be welded onto the disk portion of the blisks 112.

Figure 3:
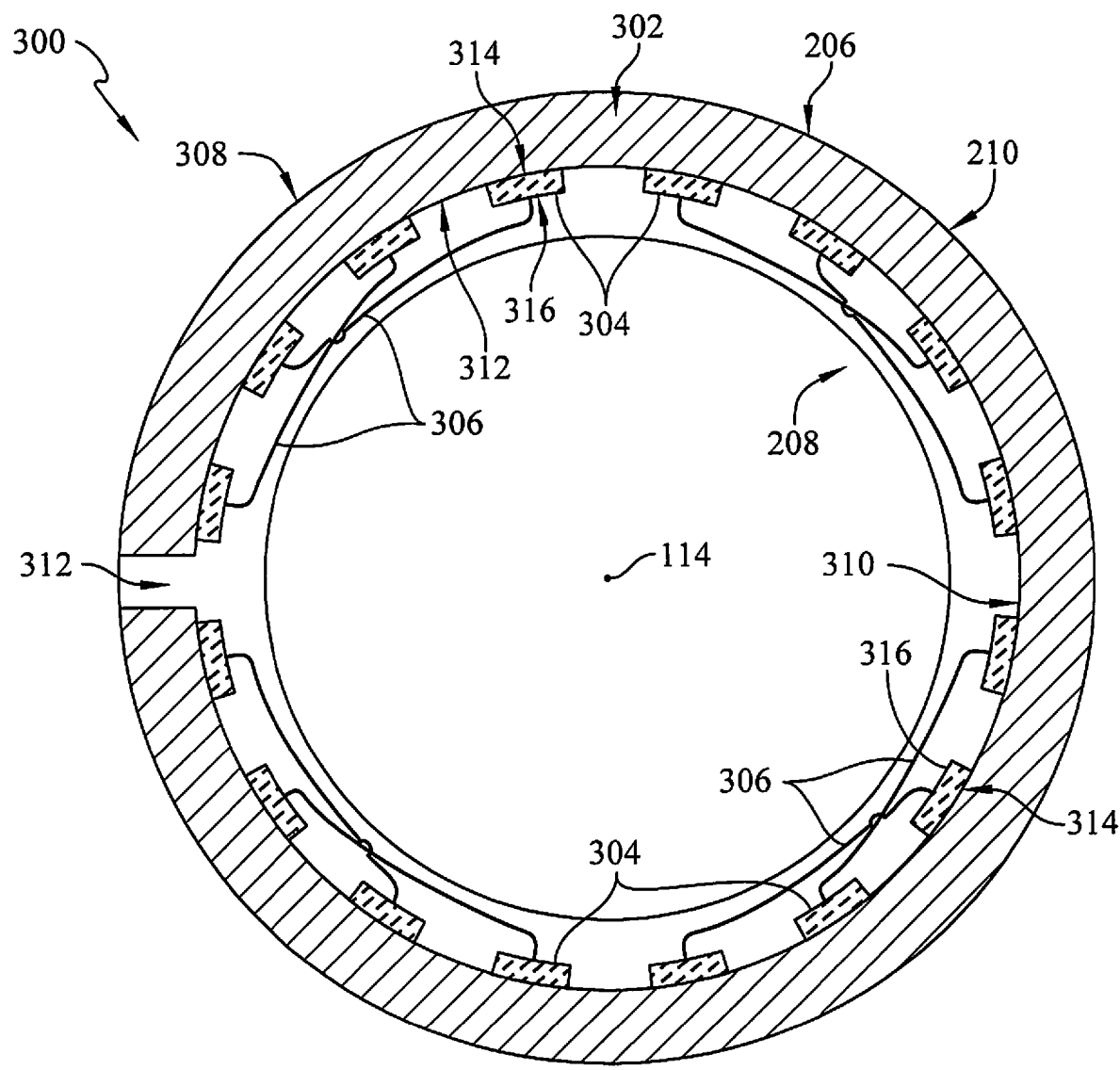
FIG. 3 is a perspective view of the blisk of FIG. 2 showing that the groove includes a piezoelectric damping ring mounted therein.

The illustrative blisk 112 additionally includes a groove 206 on the underside of the disk 202. In some embodiments, the groove 206 may be located on a thin portion extending outwardly from the disk 202 (e.g., a lip extending from the disk 202). The groove 206 has a generally concave shape that extends circumferentially about the central axis 114 on the underside of the disk 202. The groove 206 includes an opening 208 and a surface 210, or recessed portion. As shown in FIG. 3, the groove 206 is configured to receive a piezoelectric damping ring 300 coupled to, or otherwise in relative contact to, the surface 210 of the groove 206. It should be appreciated that, in some embodiments, rotational loads may hold the piezoelectric damping ring 300 in place within the groove 206.

Referring now to FIG. 3, the groove 206 is shown that includes an illustrative embodiment of the piezoelectric damping ring 300 coupled thereto. The illustrative piezoelectric damping ring 300 includes a damping ring 302 and a plurality of piezoelectric elements 304 coupled to the damping ring 302. In use, as described in further detail below, the piezoelectric damping ring 300 is capable of providing additional damping over traditional damping rings. For example, the piezoelectric damping ring 300 may be used to further reduce vibration by transferring electricity across piezoelectric elements, as described in further detail below, such as may be generated when relative motion (e.g., micro-slip) exists between the disk 202 and the damping ring 302. Accordingly, the damping ring 302 should be manufactured using a metal (e.g., brass or other like soft metal) softer than the metal of the blisk 112, such that the damping ring 302 cannot wear through the disk 202. In other words, the sacrificial material should be the damping ring 302 and not the blisk 112.

The damping ring 302 includes an outward facing portion 308 and in inward facing portion 310, as well as a split 312. As shown, the outward facing portion 308 is coupled to at least a portion of the surface 210 of the groove 206. In other words, 360° of the damping ring 302, with the exception of the split 312, touches the surface 210 of the groove 206. Accordingly, mechanical damping may be accomplished by micro-slip generated between the damping ring 302 and the disk 202, which can result from different spring constants of the blisk 112 and the damping ring 302 reflecting differently.

The piezoelectric damping ring 300 includes a plurality of piezoelectric elements 304, each of which are coupled to the damping ring 302 at different circumferential locations about the inward facing portion 310 of the damping ring 302 at an outward facing portion 314 of the piezoelectric elements 304. It should be appreciated that any known technology may be used to couple the piezoelectric elements 304 to the damping ring 302. For example, in some embodiments, the piezoelectric elements 304 may be discretely bonded to the damping ring 302. Additionally or alternatively, in some embodiments, a thin metal spray coating may be applied to each of the piezoelectric elements 304 to protect the piezoelectric elements from adverse conditions (e.g., particulate matter) and provide an electrically conductive means to send and receive power. Additionally, each of the piezoelectric elements 304 may be made of any suitable material capable of performing the functions described herein, such as ceramic strips bonded to the damping ring 302, for example. Accordingly, in such an embodiment, the piezoelectric damping ring 300 may additionally dissipate heat.

As described previously, if one of the piezoelectric elements 304 of the piezoelectric damping ring 300 becomes excited by motion, mechanical energy may be received by that excited piezoelectric element 304. This may cause the piezoelectric damping ring 300 to vibrate at another part of the piezoelectric damping ring 300 due to electrical connections between different circumferential positions. The piezoelectric damping ring 300 may then slowly rotate relative to the blisk 112 or slowly rotate relative to a stationary vane, such as in a snake like motion. This relative movement may cause additional friction damping, creating heat, which can be dissipated at least partially, such as by creating mechanical friction between the piezoelectric damping ring 300 and the groove 206 of the disk 202. To do so, as also described previously, the mechanical energy received by the excited piezoelectric element 304 can be converted to electricity, which can then be transmitted to another of the piezoelectric elements 304 connected to the excited piezoelectric element 304 and dissipated at the other piezoelectric element 304.

The illustrative piezoelectric damping ring 300 includes sixteen piezoelectric elements 304 coupled to the damping ring 302. In alternative piezoelectric damping ring embodiments, additional and/or fewer piezoelectric elements 304 may be coupled to the damping ring 302. As shown, every other of the piezoelectric elements 304 is paired (i.e., connected) at an inward facing surface 316 via a wire 306 to another of the piezoelectric elements 304 at the inward facing surface 316 of that one of the piezoelectric elements 304. In such an embodiment as the illustrative embodiment of FIG. 3, the piezoelectric damping ring 300 may support eight engine orders (i.e., N/2, wherein "N" represents the number of piezoelectric elements 304 and "2" designates the number of neighboring piezoelectric elements 304 from which the piezoelectric element 304 is wired), or eight nodal diameters. Accordingly, different engine orders may be supported based on the number of and the interconnectivity between (see, e.g., the wiring 306) the piezoelectric elements 304 of the piezoelectric damping ring 300.

To do so, one of the connected piezoelectric elements 304 may be excited by the electricity from another of the piezoelectric elements 304 that it has been connected to via the wiring 306. For example, as a result of micro-slip, mechanical energy at one of the piezoelectric elements 304 at one engine order can be converted to electrical energy and transmitted to another of the piezoelectric elements 304 at a different engine order via mechanical friction and dissipated through heat. In use, the electrical energy can be transferred from an active crossing (see, e.g., the active crossing 510 of FIG. 5) to an inactive crossing (e.g., a crossing at a different engine order).

It should be appreciated that additional and/or alternative wiring methods may be used to support additional engine orders. For example, in alternative embodiments, the wiring 306 may connect to different ends of the piezoelectric elements 304 (e.g., positively and negatively charged portions of the piezoelectric elements 304) and/or the middle of the piezoelectric elements 304 as shown in FIG. 3. Additionally or alternatively, in some embodiments, the underlying blisk 112 may be used as a conductive means to transfer electricity from one piezoelectric element 304 to another piezoelectric element 304.

Accordingly, the wiring 306 running between of the piezoelectric elements 304 at different locations can facilitate the flow of electricity from one of the piezoelectric elements 304 to dissipate the energy through mechanical damping at another one of the piezoelectric elements 304 that is out of phase with the other of the piezoelectric elements 304. In other words, mechanical energy may be extracted from a first piezoelectric element 304 at a first nodal diameter pattern, which can be used to excite the piezoelectric damping ring 300 into a second nodal diameter pattern. Accordingly, the second nodal diameter pattern of the ring may then dissipate energy through friction (i.e., generating heat). For example, if one of the piezoelectric elements 304 at a first position creates motion out of phase with the motion of a connected other of the piezoelectric elements 304 at a second position, transferring electricity converted from the mechanical energy can be used to cancel out vibration (e.g., via mechanical friction dissipated as heat).

Figure 4:
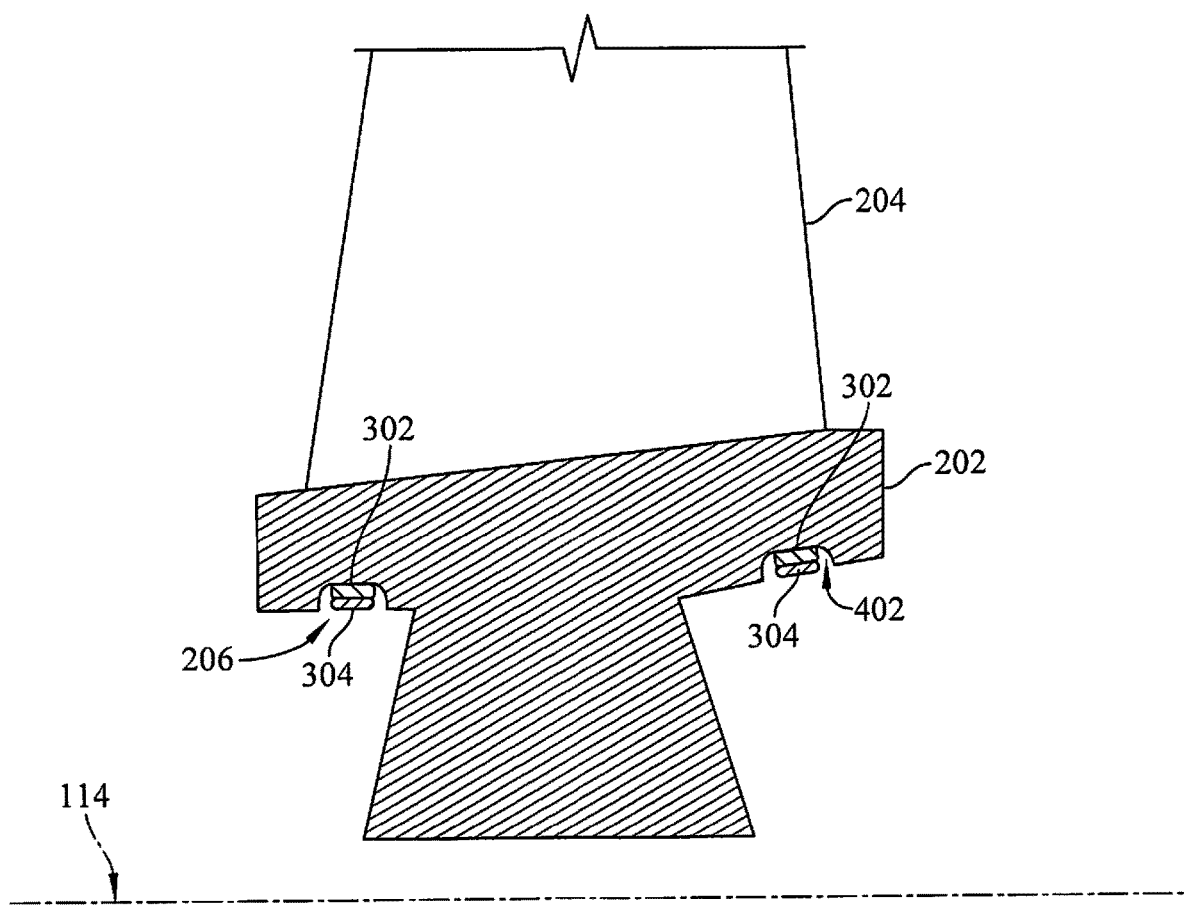
FIG. 4 is a cross-section view of a portion of the disk showing the groove including the piezoelectric damping ring of FIG. 3.

It should be appreciated that, in some embodiments, more than one piezoelectric damping ring 300 may be included, either in the same groove 206 adjacent to another piezoelectric damping ring 300 or be located in another groove such that each of the piezoelectric damping rings 300 are axisymmetric around the central axis 114 (i.e., the engine centerline). For example, as shown in FIG. 4, the groove 206 of FIGS. 2 and 3 is positioned upstream of another groove 402, which is positioned downstream of the groove 206 at a position that is axisymmetric about the central axis 114.

It should be appreciated that, in some embodiments, one or more of the piezoelectric elements 304 may be connected across resistive elements to generate heat, or power a device, for example. In other words, one or more of the piezoelectric elements 304 can double as damping elements whose additional energy can be used to power other devices of the gas turbine engine 100.

Figure 5:
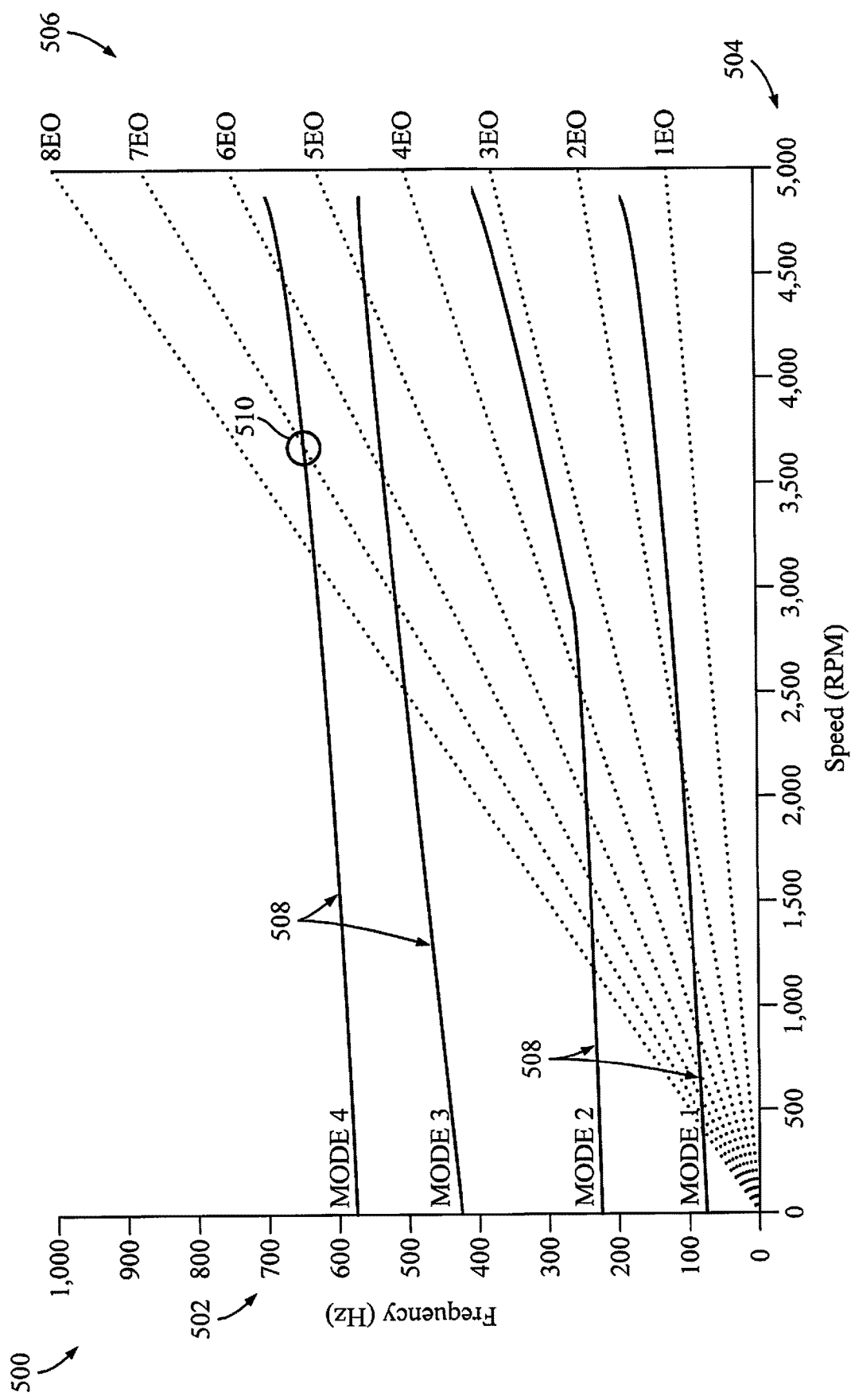
FIG. 5 is an illustration of a Campbell diagram that illustrates the operational behavior during operating modes of the gas turbine engine of FIG. 1.

Referring now to FIG. 5, an illustrative Campbell diagram 500 shows example behavior a fan measured in the environment of an engine (e.g., of the fan 110 of the gas turbine engine 100 of FIG. 1) during different operating modes. The Campbell diagram 500 includes a frequency in Hertz axis along a y-axis 502, a speed in revolutions per minute (RPM) along an x-axis 504, and a number of engine order (EO) lines 506. The Campbell diagram 500 additionally includes output of various modes 508 of the gas turbine engine 100 at increasing operational frequencies and speeds.

As shown, Mode 4 and the seventh engine (i.e., 7EO) order crossing could energize a damping ring in the seventh nodal diameter. In such an embodiment, the piezoelectric elements 304 of the piezoelectric damping ring 300 may be wired to transmit the seventh engine order energy to another engine order that does not have any crossings in the running range of the engine. Accordingly, the seventh order energy can be converted to electricity and transmitted to another piezoelectric element 304 at a different nodal diameter, such that the electricity may be used to dampen vibration by inducing micro-slip between the piezoelectric damping ring 300 and the disk 202. In other words, the piezoelectric damping ring 300 can be excited by the resulting electricity into another nodal diameter with a crossing outside the running speed of the engine (e.g., the gas turbine engine 100) where micro-slip between the blisk and the piezoelectric damping ring would dissipate the energy (i.e., between the damping ring 302 of the piezoelectric damping ring 300 and the surface 210 of the disk 202).

Figure 6:
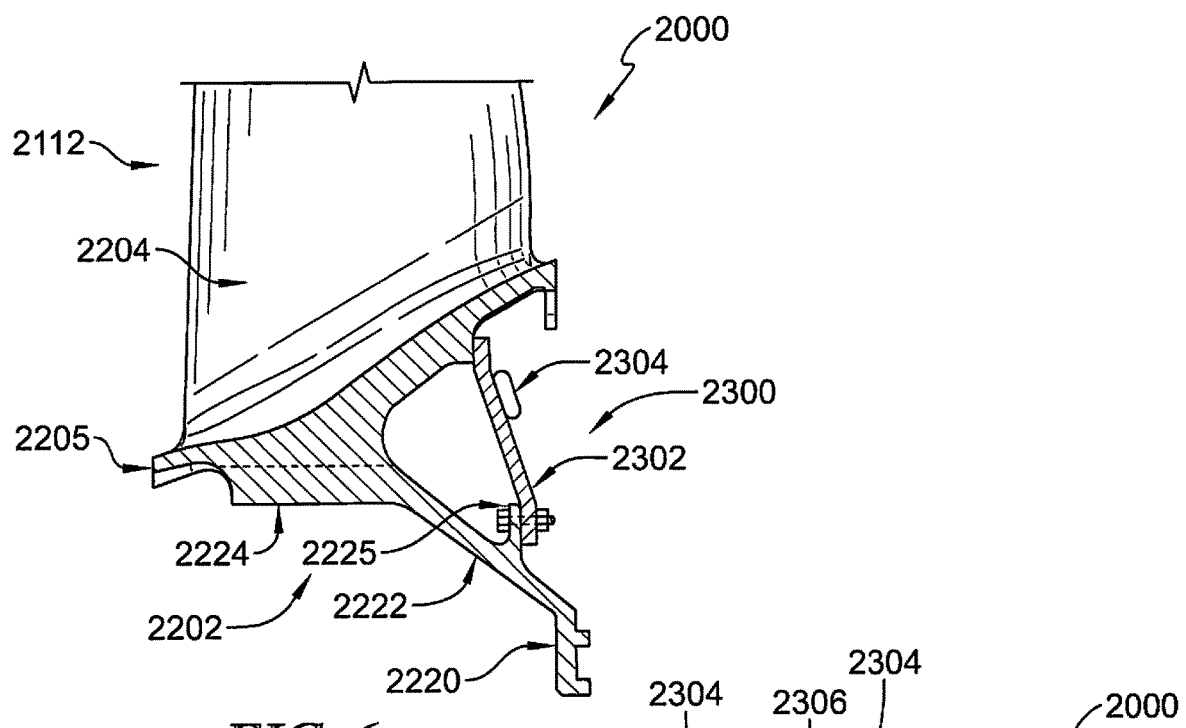
FIG. 6 is a cross-section view of a second blisk assembly adapted for use in a compressor showing that the second blisk assembly includes integrated disk, platform, and blades that form a blisk along with a piezoelectric damping ring for damping vibrations induced in the blisk during use, and showing that the piezoelectric damping ring is fastened to a flange formed by the disk portion and contacts the platform of the blisk near a mid-span region of the blades.
Figure 7:
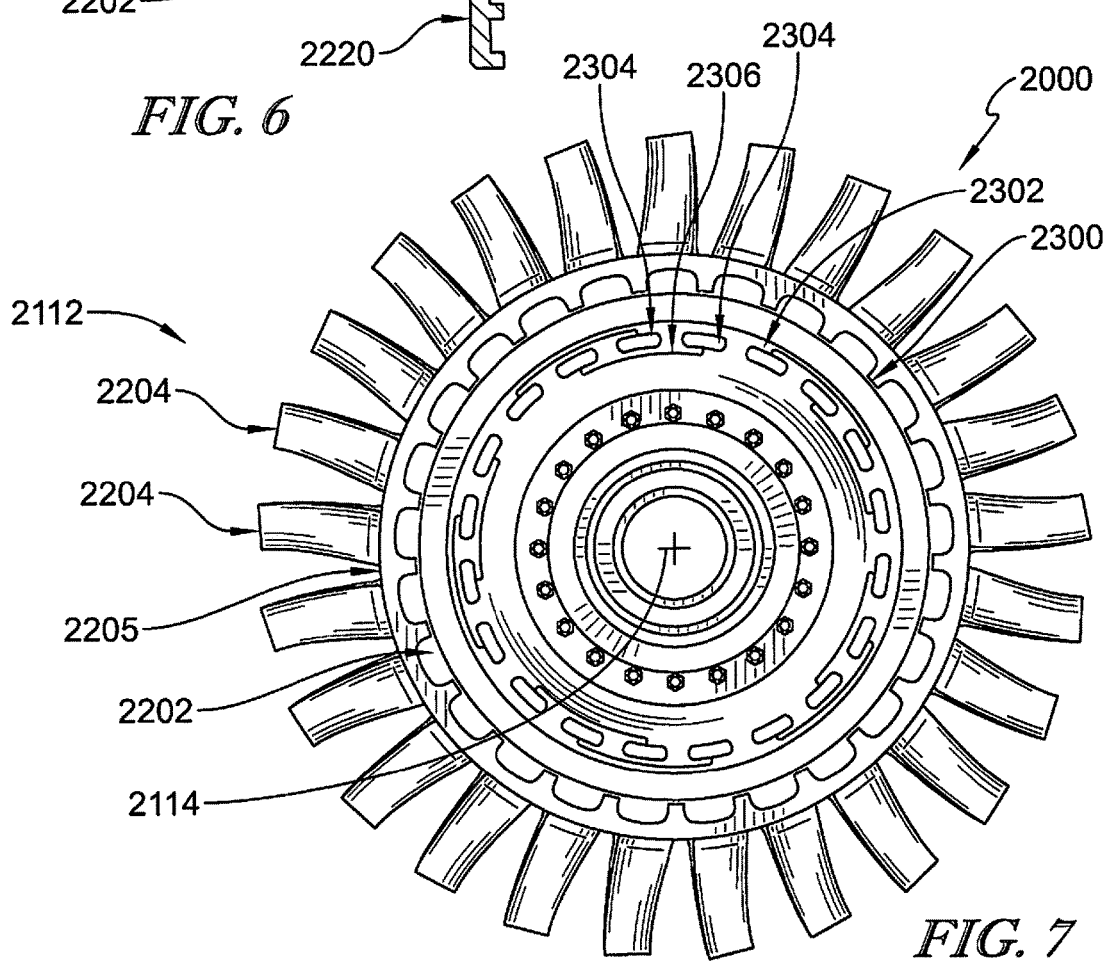
FIG. 7 is a rear elevation view of the second blisk assembly of FIG. 6 showing the piezoelectric damping ring includes a full hoop damping ring fastened to the blisk and a plurality of piezoelectric elements coupled to the full hoop damping ring.

A second blisk assembly 2000 in accordance with the present disclosure is shown in FIGS. 6 and 7. The blisk assembly 2000 includes a blisk 2112 and a piezoelectric damping ring 2300. The blisk 2112 is an integrally bladed disk or rotor similar to blisk 112 described above. The piezoelectric damping ring 2300 is coupled to the blisk 2112 and dampens vibration of the blisk assembly 2000 during use in a gas turbine engine like engine 100.

The blisk 2112 illustratively includes a disk 2202, a plurality of blades 2204, and a platform 2205 that are integrated with one another as shown in FIG. 6. The disk 2202 supports the blades 2204 and the platform 2205 during rotation of the blisk 2112. The blades 2204 interact with gasses passing through an engine to compress the gasses. The platform 2205 extends forward and aft of the blades 2204 to separate the disk 2202 from the plurality of blades 2204 so that gasses passing over the blades 2204 does not interact with the disk 2202.

The disk 2202 illustratively includes a drive arm 2220, a cone shaft 2222, a support ring 2224, and a damper flange 2225 as shown in FIG. 6. The drive arm 2220 is configured to be coupled to a shaft to receive rotation from other parts of an engine. The cone shaft 2222 extends outwardly from the drive arm 2220 to the support ring 2224. The support ring 2224 supports the blades 2204 and the platform 2205. The damper flange 2225 is cantilevered and provides a location for coupling of the piezoelectric damping ring 2300.

The piezoelectric damping ring 2300 illustratively includes a damping ring 2302, piezoelectric elements 2304, and wires 2306 as shown in FIGS. 6 and 7. The damping ring 2302 is a full hoop component that extends around a central axis 2114. The piezoelectric elements 2304 are coupled to the damping ring 2302 and are equidistantly spaced from one another circumferentially around the axis 2114.

In the illustrative embodiment, the damping ring 2302 is fastened to the damper flange 2225 by bolts along an inner portion of the damper ring 2302 as shown in FIG. 6. The damping ring 2303 contacts the platform 2205 near a mid-span of the blades 2204 along an outer portion of the damper ring 2302 where the damper ring 2302 is free for micro movements relative to the blisk 2112. In the illustrative embodiments, the piezoelectric elements 2304 are coupled to the damping ring 2302 along a middle portion of the damper ring 2302 between the inner and outer portions.

The piezoelectric elements 2304 are substantially similar to elements 304 and pass energy from one to another via wires 2306 as described herein. As described herein, the piezoelectric elements 2304 can dampen vibration in the blisk assembly 2000.

Figure 8:
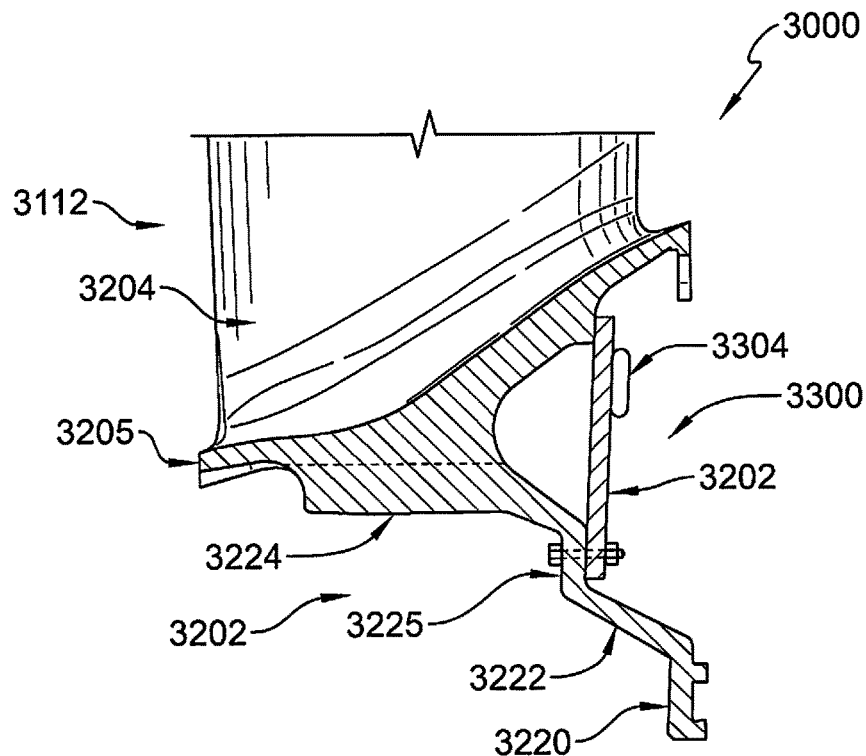
FIG. 8 is a cross-section view of a third blisk assembly adapted for use in a compressor, similar to that shown in FIGS. 6 and 7, showing that the third blisk assembly includes integrated disk, platform, and blades that form a blisk along with a piezoelectric damping ring for damping vibrations induced in the blisk during use, and showing that the piezoelectric damping ring is fastened to a bend formed by the disk of the blisk and contacts the platform of the blisk at an aft end of the platform.

A third blisk assembly 3000 in accordance with the present disclosure is shown in FIG. 8. The blisk assembly 3000 includes a blisk 3112 and a piezoelectric damping ring 3300. The blisk 3112 is an integrally bladed disk or rotor similar to blisk 112 described above. The piezoelectric damping ring 3300 is coupled to the blisk 3112 and dampens vibration of the blisk assembly 3000 during use in a gas turbine engine like engine 100.

The blisk 3112 illustratively includes a disk 3202, a plurality of blades 3204, and a platform 3205 that are integrated with one another as shown in FIG. 8. The disk 3202 supports the blades 3204 and the platform 3205 during rotation of the blisk 3112. The blades 3204 interact with gasses passing through an engine to compress the gasses. The platform 3205 extends forward and aft of the blades 3204 to separate the disk 3202 from the plurality of blades 3204 so that gasses passing over the blades 3204 does not interact with the disk 3202.

The disk 3202 illustratively includes a drive arm 3220, a cone shaft 3222, a support ring 3224, and a damper flange 3225 as shown in FIG. 8. The drive arm 3220 is configured to be coupled to a shaft to receive rotation from other parts of an engine. The cone shaft 3222 extends outwardly from the drive arm 3220 to the support ring 3224. The support ring 3224 supports the blades 3204 and the platform 3205. The damper flange 3225 interconnects the cone shaft 3222 and the SUPPORT RING 3224. The damper flange 3225 also provides a location for coupling of the piezoelectric damping ring 3300.

The piezoelectric damping ring 3300 illustratively includes a damping ring 3302, piezoelectric elements 3304, and wires as shown in FIG. 8. The damping ring 3302 is a full hoop component. The piezoelectric elements 3304 are coupled to the damping ring 3302 and are equidistantly spaced from one another circumferentially around the axis 3114.

In the illustrative embodiment, the damping ring 3302 is fastened to the damper flange 3225 by bolts along an inner portion of the damper ring 3302 as shown in FIG. 8. The damping ring 3303 contacts the platform 3205 near a mid-span of the blades 3204 along an outer portion of the damper ring 3302 where the damper ring 3302 is free for micro movements relative to the blisk 3112. In the illustrative embodiments, the piezoelectric elements 3304 are coupled to the damping ring 3302 along a middle portion of the damper ring 3302 between the inner and outer portions.

The piezoelectric elements 3304 are substantially similar to elements 304 and pass energy from one to another via wires as described herein. As described herein, the piezoelectric elements 3304 can dampen vibration in the blisk assembly 3000.

Figure 9:
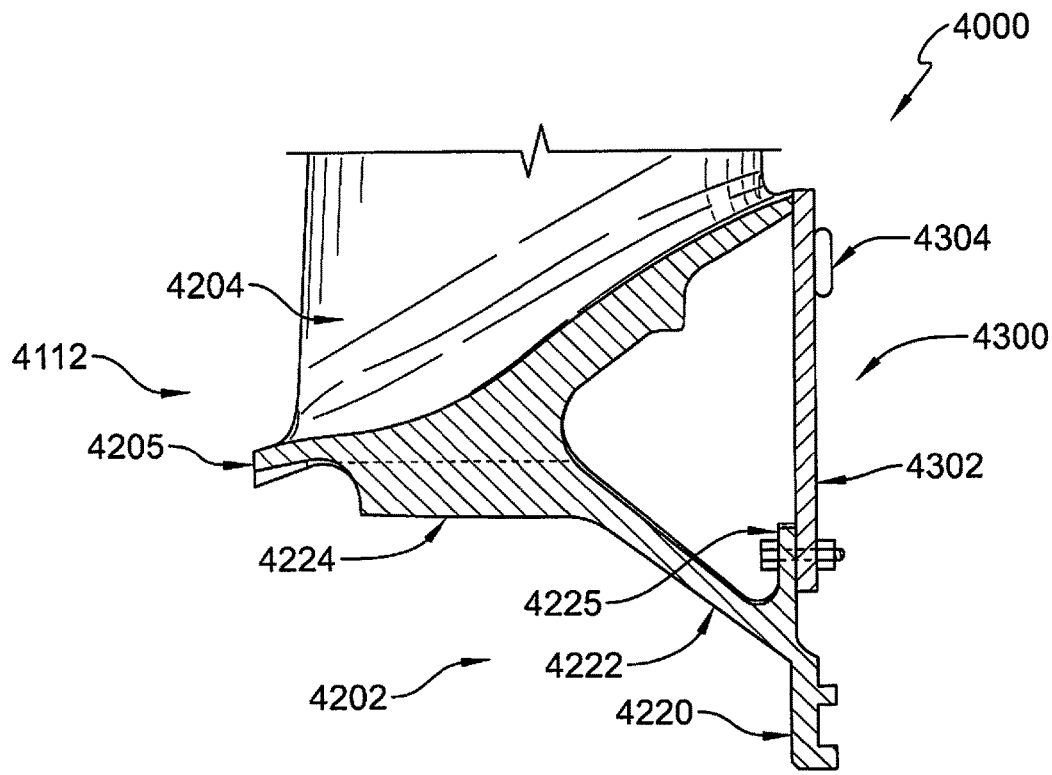
FIG. 9 is a cross-section view of a fourth blisk assembly adapted for use in a compressor, similar to that shown in FIGS. 6 and 7, showing that the fourth blisk assembly includes integrated disk, platform, and blades that form a blisk along with a piezoelectric damping ring for damping vibrations induced in the blisk during use, and showing that the piezoelectric damping ring is fastened to a flange formed by the disk of the blisk and contacts the platform of the blisk at an aft end.

A fourth blisk assembly 4000 in accordance with the present disclosure is shown in FIG. 9. The blisk assembly 4000 includes a blisk 4112 and a piezoelectric damping ring 4300. The blisk 4112 is an integrally bladed disk or rotor similar to blisk 112 described above. The piezoelectric damping ring 4300 is coupled to the blisk 4112 and dampens vibration of the blisk assembly 4000 during use in a gas turbine engine like engine 100.

The blisk 4112 illustratively includes a disk 4202, a plurality of blades 4204, and a platform 4205 that are integrated with one another as shown in FIG. 9. The disk 4202 supports the blades 4204 and the platform 4205 during rotation of the blisk 4112. The blades 4204 interact with gasses passing through an engine to compress the gasses. The platform 4205 extends forward and aft of the blades 4204 to separate the disk 4202 from the plurality of blades 4204 so that gasses passing over the blades 4204 does not interact with the disk 4202.

The disk 4202 illustratively includes a drive arm 4220, a cone shaft 4222, a support ring 4224, and a damper flange 4225 as shown in FIG. 9. The drive arm 4220 is configured to be coupled to a shaft to receive rotation from other parts of an engine. The cone shaft 4222 extends outwardly from the drive arm 4220 to the support ring 4224. The support ring 4224 supports the blades 4204 and the platform 4205. The damper flange 4225 is cantilevered from the cone shaft 4222 and provides a location for coupling of the piezoelectric damping ring 4300.

The piezoelectric damping ring 4300 illustratively includes a damping ring 4302, piezoelectric elements 4304, and wires as shown in FIG. 9. The damping ring 4302 is a full hoop component. The piezoelectric elements 4304 are coupled to the damping ring 4302 and are equidistantly spaced from one another circumferentially around the axis 4114.

In the illustrative embodiment, the damping ring 4302 is fastened to the damper flange 4225 by bolts along an inner portion of the damper ring 4302 as shown in FIG. 9. The damping ring 4303 contacts the platform 4205 at an aft end of the platform 4205 along an outer portion of the damper ring 4302 where the damper ring 4302 is free for micro movements relative to the blisk 4112. In the illustrative embodiments, the piezoelectric elements 4304 are coupled to the damping ring 4302 along a middle portion of the damper ring 4302 between the inner and outer portions.

The piezoelectric elements 4304 are substantially similar to elements 304 and pass energy from one to another via wires as described herein. As described herein, the piezoelectric elements 4304 can dampen vibration in the blisk assembly 4000.

Figure 10:
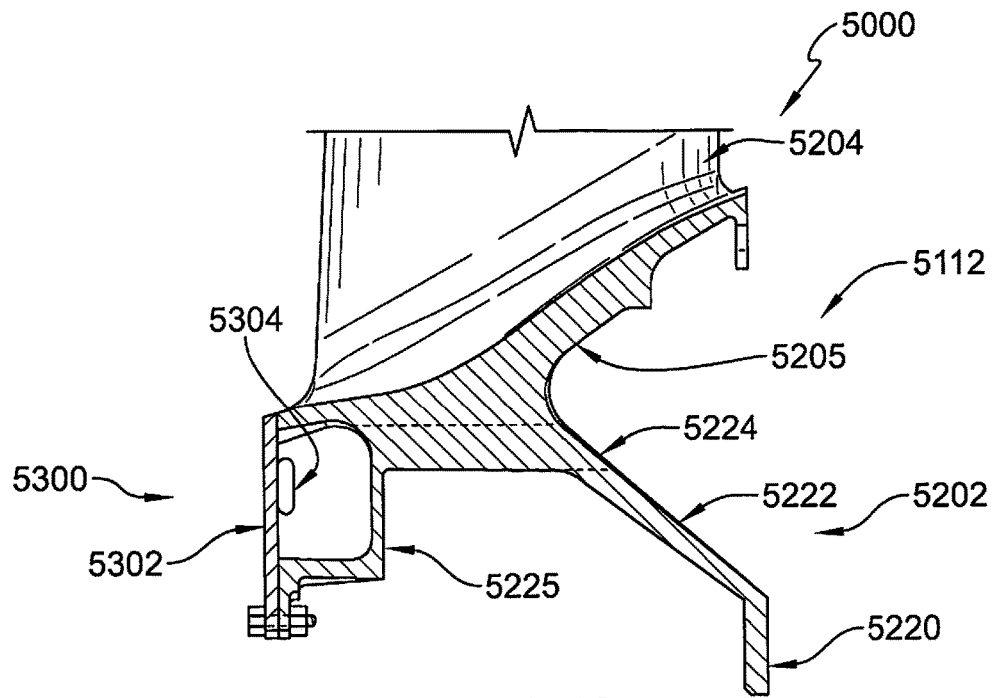
FIG. 10 is a cross-section view of a fifth blisk assembly adapted for use in a compressor, similar to that shown in FIGS. 6 and 7, showing that the fifth blisk assembly includes integrated disk, platform, and blades that form a blisk along with a piezoelectric damping ring for damping vibrations induced in the blisk during use, and showing that the piezoelectric damping ring is fastened to a flange formed by the disk of the blisk and contacts the platform portion at a forward end.

A fifth blisk assembly 5000 in accordance with the present disclosure is shown in FIG. 10. The blisk assembly 5000 includes a blisk 5112 and a piezoelectric damping ring 5300. The blisk 5112 is an integrally bladed disk or rotor similar to blisk 112 described above. The piezoelectric damping ring 5300 is coupled to the blisk 5112 and dampens vibration of the blisk assembly 5000 during use in a gas turbine engine like engine 100.

The blisk 5112 illustratively includes a disk 5202, a plurality of blades 5204, and a platform 5205 that are integrated with one another as shown in FIG. 10. The disk 5202 supports the blades 5204 and the platform 5205 during rotation of the blisk 5112. The blades 5204 interact with gasses passing through an engine to compress the gasses. The platform 5205 extends forward and aft of the blades 5204 to separate the disk 5202 from the plurality of blades 5204 so that gasses passing over the blades 5204 does not interact with the disk 5202.

The disk 5202 illustratively includes a drive arm 5220, a cone shaft 5222, a support ring 5224, and a damper flange 5225 as shown in FIG. 10. The drive arm 5220 is configured to be coupled to a shaft to receive rotation from other parts of an engine. The cone shaft 5222 extends outwardly from the drive arm 5220 to the support ring 5224. The support ring 5224 supports the blades 5204 and the platform 5205. The damper flange 5225 is cantilevered from the support ring 5224 and has an L-shaped cross-sectional shape that extends in a forward direction. The damper flange 5225 provides a location for coupling of the piezoelectric damping ring 5300.

The piezoelectric damping ring 5300 illustratively includes a damping ring 5302, piezoelectric elements 5304, and wires as shown in FIG. 10. The damping ring 5302 is a full hoop component. The piezoelectric elements 5304 are coupled to the damping ring 5302 and are equidistantly spaced from one another circumferentially around the axis 5114.

In the illustrative embodiment, the damping ring 5302 is fastened to the damper flange 5225 by bolts along an inner portion of the damper ring 5302 as shown in FIG. 10. The damping ring 5303 contacts the platform 5205 at a forward end of the platform 5205 along an outer portion of the damper ring 5302 where the damper ring 5302 is free for micro movements relative to the blisk 5112. In the illustrative embodiments, the piezoelectric elements 5304 are coupled to the damping ring 5302 along a middle portion of the damper ring 5302 between the inner and outer portions.

The piezoelectric elements 5304 are substantially similar to elements 304 and pass energy from one to another via wires as described herein. As described herein, the piezoelectric elements 5304 can dampen vibration in the blisk assembly 5000.

Figure 11:
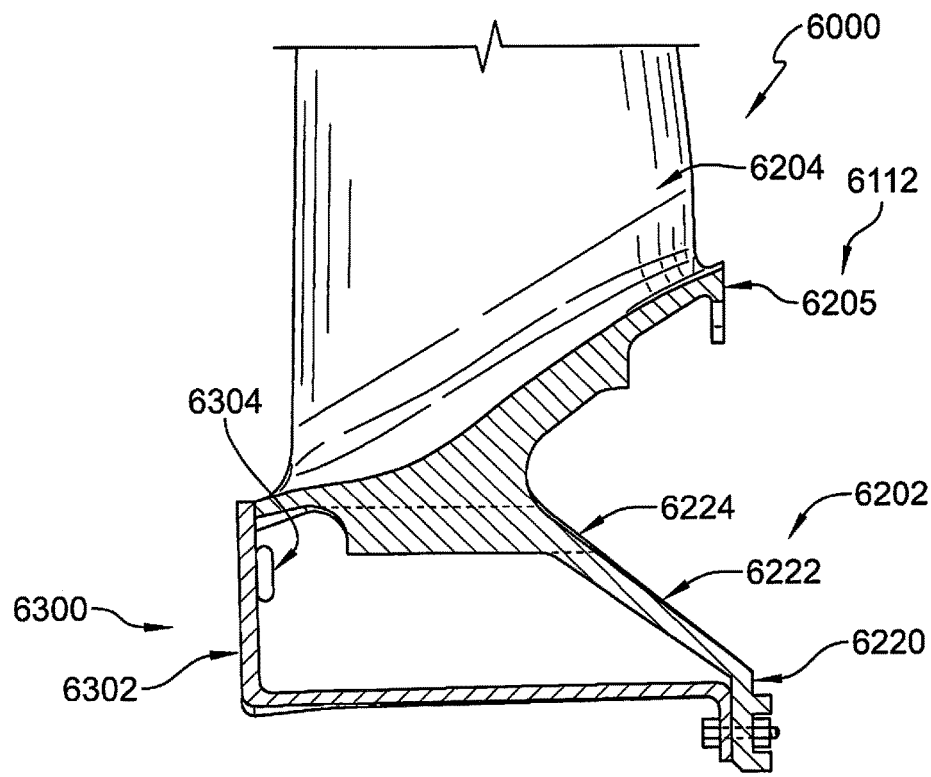
FIG. 11 is a cross-section view of a sixth blisk assembly adapted for use in a compressor, similar to that shown in FIGS. 6 and 7, showing that the sixth blisk assembly includes integrated disk, platform, and blades that form a blisk along with a piezoelectric damping ring for damping vibrations induced in the blisk during use, and showing that the piezoelectric damping ring is fastened to a drive arm of the disk and contacts the platform portion at a forward end.

A sixth blisk assembly 6000 in accordance with the present disclosure is shown in FIG. 11. The blisk assembly 6000 includes a blisk 6112 and a piezoelectric damping ring 6300. The blisk 6112 is an integrally bladed disk or rotor similar to blisk 112 described above. The piezoelectric damping ring 6300 is coupled to the blisk 6112 and dampens vibration of the blisk assembly 6000 during use in a gas turbine engine like engine 100.

The blisk 6112 illustratively includes a disk 6202, a plurality of blades 6204, and a platform 6205 that are integrated with one another as shown in FIG. 11. The disk 6202 supports the blades 6204 and the platform 6205 during rotation of the blisk 6112. The blades 6204 interact with gasses passing through an engine to compress the gasses. The platform 6205 extends forward and aft of the blades 6204 to separate the disk 6202 from the plurality of blades 6204 so that gasses passing over the blades 6204 does not interact with the disk 6202.

The disk 6202 illustratively includes a drive arm 6220, a cone shaft 6222, and a support ring 6224 as shown in FIG. 11. The drive arm 6220 is configured to be coupled to a shaft to receive rotation from other parts of an engine. The cone shaft 6222 extends outwardly from the drive arm 6220 to the support ring 6224. The support ring 6224 supports the blades 6204 and the platform 6205.

The piezoelectric damping ring 6300 illustratively includes a damping ring 6302, piezoelectric elements 6304, and wires as shown in FIG. 11. The damping ring 6302 is a full hoop component. The piezoelectric elements 6304 are coupled to the damping ring 6302 and are equidistantly spaced from one another circumferentially around the axis 6114.

In the illustrative embodiment, the damping ring 6302 is fastened to the drive arm 6220 by bolts along an inner portion of the damper ring 6302 as shown in FIG. 11. The damping ring 6303 contacts the platform 6205 at a forward end of the platform 6205 along an outer portion of the damper ring 6302 where the damper ring 6302 is free for micro movements relative to the blisk 6112. In the illustrative embodiments, the piezoelectric elements 6304 are coupled to the damping ring 6302 along a middle portion of the damper ring 6302 between the inner and outer portions.

The piezoelectric elements 6304 are substantially similar to elements 304 and pass energy from one to another via wires as described herein. As described herein, the piezoelectric elements 6304 can dampen vibration in the blisk assembly 6000.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blisk assembly adapted for use in a gas turbine engine, the blisk assembly comprising
 a disk extending circumferentially about a central axis of the blisk assembly,
 a plurality of blades integrally coupled to the disk that extend outwardly from the disk in a radial direction away from the central axis, and
 a piezoelectric damping ring that includes a damping ring and a plurality of piezoelectric elements coupled to the damping ring, wherein the piezoelectric damping ring forms a full hoop around the central axis and each of the plurality of piezoelectric elements is configured to convert electrical energy in response to generation of mechanical energy and to convert received electrical energy to mechanical energy in response to receipt of the electrical energy from another of the plurality of piezoelectric elements so that vibrations of the blisk assembly are dampened by distribution of energy across one or more of the plurality of piezoelectric elements, wherein a first piezoelectric element included in the plurality of piezoelectric elements is located on a first nodal diameter pattern of the blisk assembly, a second piezoelectric element included in the plurality of piezoelectric elements is located on a second nodal diameter pattern of the blisk assembly that is different than the first nodal diameter pattern, and the first piezoelectric element is electrically connected with the second piezoelectric element to transmit the mechanical energy of the first piezoelectric element on the first nodal diameter pattern to the second piezoelectric element on the second nodal diameter pattern, via conversion between mechanical energy and electrical energy, during use of the blisk assembly to dissipate the mechanical energy as heat via mechanical friction between the damping ring and the disk and dampen the vibrations of the blisk assembly.

2. The blisk assembly of claim 1, further comprising a plurality of wires, wherein each wire connects at least two of the plurality of piezoelectric elements to each other to transmit electricity therebetween.

3. The blisk assembly of claim 1, wherein the damping ring is coupled to the disk by a plurality of fasteners at a first radius and the damping ring contacts another portion of the blisk assembly at a second radius spaced apart from the plurality of fasteners to allow for relative movement of the damping ring relative to the disk at the second radius.

4. The blisk assembly of claim 3, wherein the second radius is located outward of the first radius.

5. The blisk assembly of claim 4, wherein the plurality of piezoelectric elements arranged at a third radius spaced apart from the first radius to allow for relative movement of the plurality of piezoelectric elements relative to the disk.

6. The blisk assembly of claim 5, wherein the third radius is located between the first radius and the second radius.

7. The blisk assembly of claim 1, wherein each of the piezoelectric elements are coupled to the damping ring using discrete bonding.

8. The blisk assembly of claim 1, wherein each of the piezoelectric elements includes a metal spray coating to provide an electrically conductive means to send and receive power.

9. The blisk assembly of claim 1, wherein each of the plurality of piezoelectric elements are circumferentially spaced an equidistant amount from neighboring piezoelectric elements.

10. The blisk assembly of claim 1, further comprising a platform integrally formed with the disk and the plurality of blades that separates the disk from the plurality of blades so that gasses passing over the blades does not interact with the disk, and wherein the damping ring is coupled to the disk by a plurality of fasteners at a first radius and the damping ring contacts the platform at a second radius radially outward of the plurality of fasteners to allow for relative movement of the damping ring relative to the disk at the second radius.

11. The blisk assembly of claim 10, wherein the disk is formed to include a cantilevered flange to which the damping ring is fastened.

12. The blisk assembly of claim 10, wherein the damping ring contacts the platform near a mid-span of the plurality of blades.

13. The blisk assembly of claim 10, wherein the damping ring contacts the platform at an aft end of the platform.

14. The blisk assembly of claim 10, wherein the damping ring contacts the platform at forward end of the platform.

* * * * *